US007390449B2

(12) United States Patent
Ibata et al.

(10) Patent No.: US 7,390,449 B2
(45) Date of Patent: Jun. 24, 2008

(54) METHOD OF MANUFACTURING CERAMIC MATERIAL BODY

(75) Inventors: Akihiko Ibata, Takaishi (JP); Michio Oba, Tondabayashi (JP); Toshihiro Yoshizawa, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 301 days.

(21) Appl. No.: 10/169,400

(22) PCT Filed: Nov. 6, 2001

(86) PCT No.: PCT/JP01/09696

§ 371 (c)(1),
(2), (4) Date: Aug. 6, 2002

(87) PCT Pub. No.: WO02/38347

PCT Pub. Date: May 16, 2002

(65) Prior Publication Data

US 2003/0057589 A1 Mar. 27, 2003

(30) Foreign Application Priority Data

Nov. 9, 2000 (JP) ............................ 2000-341538

(51) Int. Cl.
*B28B 3/00* (2006.01)
*H01F 17/03* (2006.01)
*C04B 35/64* (2006.01)

(52) U.S. Cl. ........................ 264/157; 264/156; 264/614; 336/83; 336/233

(58) Field of Classification Search ............. 156/89.11, 156/89.12, 89.22, 252, 253; 264/138, 154, 264/157, 163, 614, 615, 616, 617, 618, 650, 264/156; 336/83, 233, 234, 217
See application file for complete search history.

(56) References Cited

U.S. PATENT DOCUMENTS 3,882,059 A * 5/1975 Elderbaum ................. 29/25.42
4,366,342 A * 12/1982 Breedlove .................. 174/52.4
4,525,597 A * 6/1985 Abe .......................... 174/52.4

(Continued)

FOREIGN PATENT DOCUMENTS

JP 6-224073 8/1994

(Continued)

*Primary Examiner*—Matthew J. Daniels
(74) *Attorney, Agent, or Firm*—Steptoe & Johnson LLP

(57) ABSTRACT

A method of manufacturing ceramic bodies comprising the steps of: preparing a ceramic sheet; forming through holes in the ceramic sheet, each of the through hole forming at least one part of the contour of each ceramic bodies; and cutting the ceramic sheet into pieces of ceramic bodies. The ceramic sheet can be a single ceramic sheet or a laminate of ceramic sheets. The method of manufacturing ceramic bodies further comprises a step of forming a recess in the ceramic sheet, or pressure molding or partially removing of the ceramic body, as required. The manufacturing method provides inexpensive production of small ceramic elements having a complicated shape and extremely smooth surfaces with less uneven filling and nonuniform density.

13 Claims, 9 Drawing Sheets

U.S. PATENT DOCUMENTS

| | | | | |
|---|---|---|---|---|
| 5,276,963 | A * | 1/1994 | Flanders | 29/852 |
| 5,305,523 | A * | 4/1994 | Bross et al. | 29/832 |
| 5,599,413 | A * | 2/1997 | Nakao et al. | 156/89.12 |
| 6,007,758 | A * | 12/1999 | Fleming et al. | 264/429 |
| 6,087,921 | A * | 7/2000 | Morrison | 336/200 |
| 6,094,123 | A * | 7/2000 | Roy | 336/200 |
| 6,131,041 | A * | 10/2000 | Takeda et al. | 455/550.1 |
| 6,223,419 | B1 * | 5/2001 | Abramov | 29/602.1 |

FOREIGN PATENT DOCUMENTS

| | | |
|---|---|---|
| JP | 7-23509 | 5/1995 |
| JP | 8-78273 | 3/1996 |
| JP | 10-217227 | 8/1998 |

* cited by examiner

METHOD OF MANUFACTURING CERAMIC MATERIAL BODY

FIELD OF THE INVENTION

The present invention relates to a method of manufacturing ceramic bodies for use in bobbins, core materials, or base materials of electronic components.

BACKGROUND OF THE INVENTION

Electronic components have found wide applications in various kinds of electronic equipment and communication devices. With recent size and cost reduction of electronic components, it is becoming more important to reduce the size and cost of ceramic elements for use in bobbins, core materials, or base materials thereof as well.

Conventionally, these ceramic bodies have been manufactured by powder molding. The powder molding process includes the steps of: adding a binder to a ceramic raw material; forming ceramic granules in a granulation process; filling the ceramic granules in a mold; molding the granules by uniaxially pressing followed by a sintering of the molded object.

In the powder molding process, ceramic granules must be filled in a mold evenly. Unevenly filled granules cause problems, such as improper pressing, incorrect height, and moreover, breakdown of the pins or the mold. Furthermore, in the case of a small and complicated shaped component, filling granules in every corner of the mold is difficult. Increasing molding pressure to efficiently fill the granules causes problems, such as breakdown of the mold.

As described above, in the powder molding process, it is essential to fill ceramic granules in a mold evenly. For this purpose, powder fluidity of the ceramic granules is important. Ceramic granules have excellent powder fluidity when they are spherical and have diameters of at least 100 μm. In addition, for the granules to be filled evenly, the mold must have a size more than ten times the diameter of each granule.

However, with the downsizing of ceramic elements, it has become difficult to satisfy the necessary conditions for ensuring the relationship between the mold size and the diameter of the ceramic granule, and powder fluidity. In addition, for cost reduction of the products, it is necessary to use a multi-cavity mold. However, granules tend to be filled in the multi-cavity mold more unevenly. Therefore, it is difficult to obtain a smaller ceramic element and cost reduction thereof at the same time.

The present invention addresses the conventional problems discussed above. Therefore, it is an object of the present invention to provide a manufacturing method in which small ceramic elements can be produced at a low cost by punching a ceramic sheet using a face-forming mold of a multi-pin structure and cutting the ceramic sheet into separate pieces.

DISCLOSURE OF THE INVENTION

The method of manufacturing ceramic bodies of the present invention comprises the steps of: preparing a ceramic sheet; forming through holes, each forming at least a part of the contour of each ceramic element; and cutting the ceramic sheet into separate elements. The ceramic sheet may be a single ceramic sheet or a laminate of ceramic sheets.

As required, the method of manufacturing ceramic elements of the present invention further comprises: a step of providing, in the ceramic sheet, a recess for forming at least a part of the contour of each ceramic element; and a pressure-molding step for forming at least a part of the contour of each ceramic element; and a partially removing step for forming at least a part of the contour of each ceramic element.

The present invention allows production of excellent small ceramic elements of a complicated shape at a low cost so that uneven filling and nonuniform density thereof can be minimized.

DESCRIPTION OF THE PREFERRED EMBODIMENTS

Figure 1:
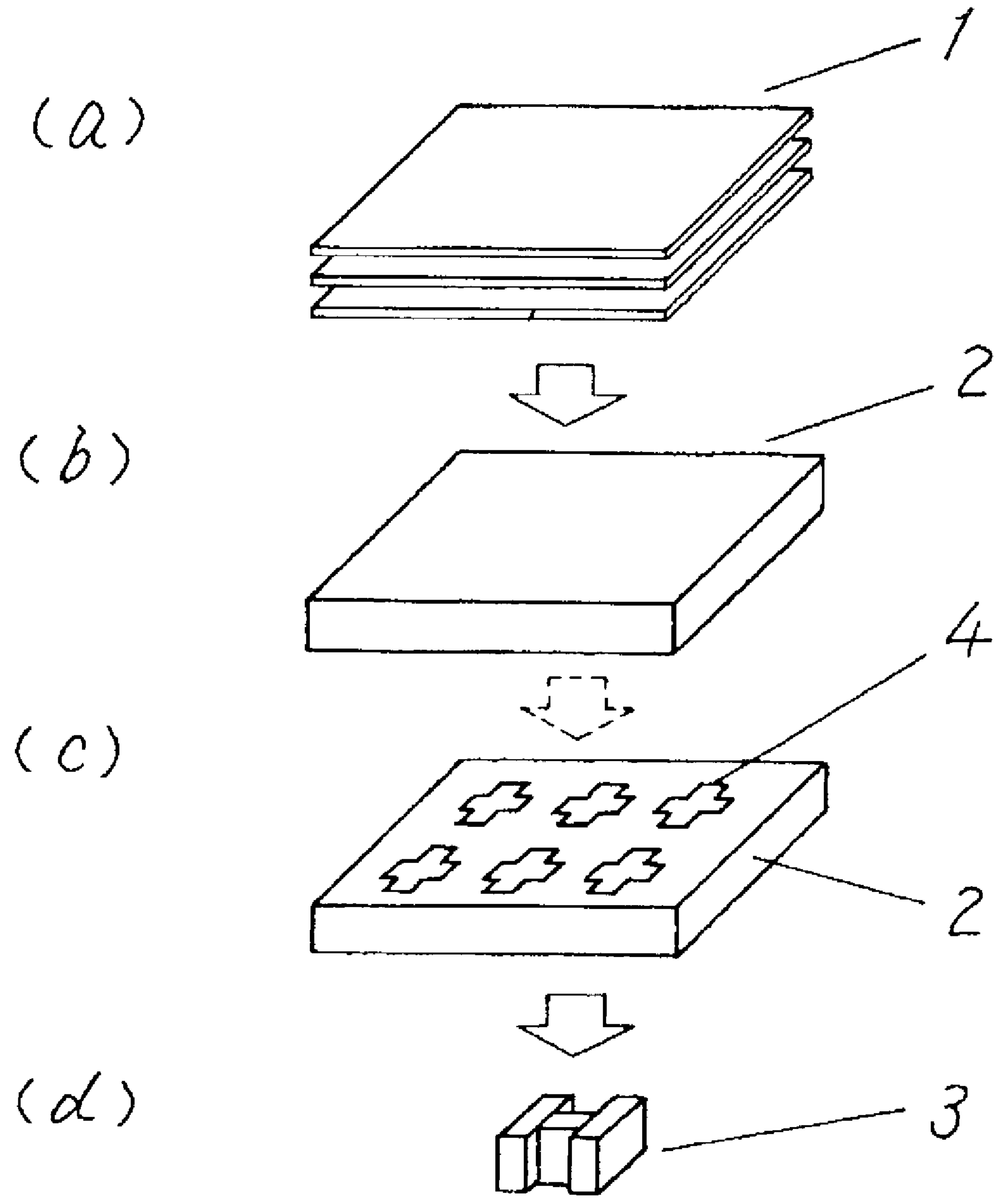
FIGS. 1(*a*) to (*d*) are schematic perspective views showing a formation of a ceramic body in accordance with an exemplary embodiment of the present invention.

A method of manufacturing ceramic bodies of the present invention comprises: forming through holes each forming at least a part of the contour of each ceramic element; and thereafter cutting the ceramic sheet into separate ceramic elements. The present invention can provide an excellent and small ceramic element of a complicated shape with less uneven filling and less nonuniform density than provided by prior art processes.

In the present invention, at least one part of the contour of a ceramic element is defined as a reference face of the ceramic element. For example, suppose that the reference shape of a ceramic element is a rectangular parallelepiped. Then, six faces forming a rectangular parallelepiped are reference faces of the ceramic element. When a shape having a recess in any one of the six reference faces is required, one reference face is subjected to molding, for example. Moreover, in the method of manufacturing ceramic bodies of this invention, the shape of at least one part of the contour of each ceramic element is formed of a flat surface or a combination of a flat surface and a slant surface.

A method of manufacturing ceramic bodies of another embodiment of the present invention comprises: pressure-molding laminate 2 so as to form at least one part of the contour of each ceramic body 3; forming through holes 4; and thereafter cutting the laminate along cutting lines 5 to form separate ceramic bodies 3. This method can improve uniformity of laminate 2 by pressure molding more easily than the method of forming through holes 4 and recesses 6 during pressure molding.

In reverse order, after formation of through holes 4, pressure molding can further be performed so as to form at least one part of the contour of each ceramic body 3, and thereafter the laminate can be cut along cutting lines 5 into separate ceramic bodies 3. In this method, pressure molding is performed after the formation of through holes 4. These operations can ensure a ceramic element having a pressure-molded face with excellent flatness.

A method of manufacturing ceramic bodies of still another embodiment of the present invention comprises: partially removing a portion of laminate 2 that forms at least one part of the contour of each ceramic body 3; forming through holes 4; and cutting the laminate along cutting lines 5 to obtain separate ceramic bodies 3. In this method, after a portion that forms a part of the contour is removed, through holes 4 are formed. These operations can prevent nonuniform density of laminate 2 caused by the formation of recesses 6. Therefore, even in the case of a complicated shape of the elements, excellent ceramic bodies 3 having uniform density can be obtained. As another feature of this method, it allows formation of deeper recesses 6 under the reference face more easily than the method using pressure molding, for example.

The methods for partially removing laminate 2 include various means, such as grinding, laser machining, and sand-blasting.

The partial removal of laminate 2 may be performed after the formation of through holes 4. In this case, excellent ceramic bodies 3 having extremely uniform density can be obtained, because recesses 6 are formed after the partial removal.

Figure 2:
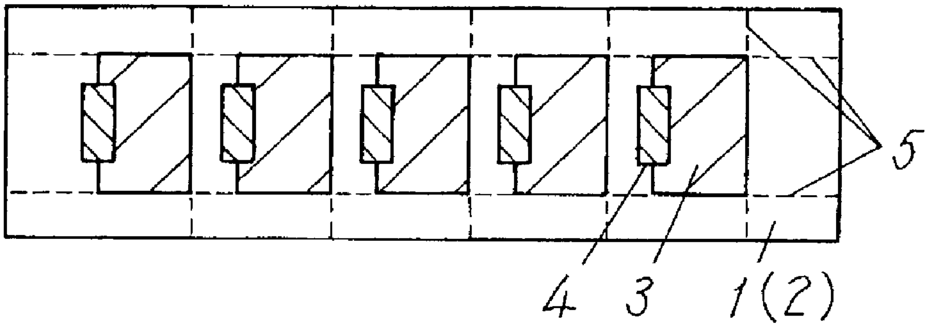
FIG. 2 is a schematic front view showing a formation of ceramic bodies in accordance with an exemplary embodiment of the present invention.

In the description of the present invention, the meaning of "at least one part of the contour of ceramic body 3 corresponds to one reference face of ceramic body 3" is illustrated, for example, in a ceramic body 3 shown in FIG. 2. A plane that is opposite to and not in contact with through hole 4 of ceramic body 3 corresponds to the one reference face.

Figure 3:
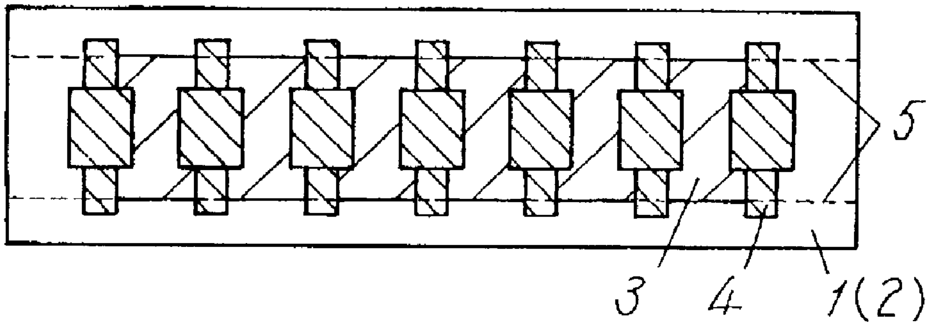
FIG. 3 is a schematic front view showing a formation of ceramic bodies in accordance with an exemplary embodiment of the present invention.
Figure 4:
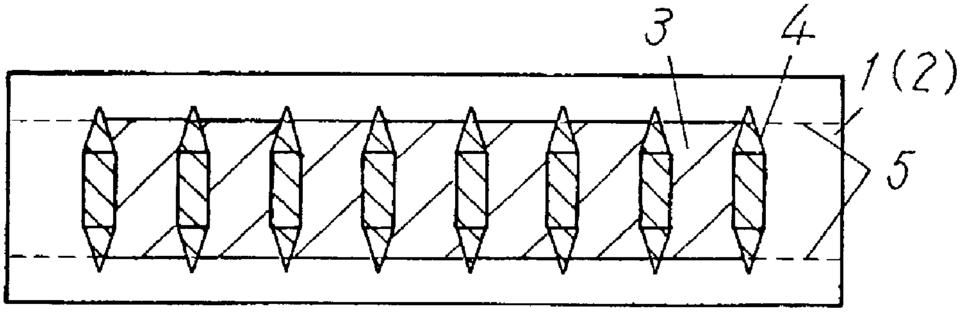
FIG. 4 is a schematic front view showing a formation of ceramic bodies in accordance with an exemplary embodiment of the present invention.

The meaning of "at least one part of the contour of ceramic body 3 corresponds to two reference face of ceramic body 3" is illustrated, for example, in a ceramic body 3 shown in FIG. 3. Two opposite reference faces are formed when through holes 4 are formed.

The meaning of "a shape of at least one part of the contour of ceramic body 3 is formed of a flat surface" is that at least one part of the contour is formed like a flat surface by a through hole or a cutting operation, as shown in FIGS. 2 and 3.

The meaning of "a shape of at least one part of the contour of ceramic body 3 is formed of a flat surface and a slant surface" is that a shape of at least one part of the contour of ceramic body 3 is made of a combination of a flat surface and a slant surface intersecting the flat surface at an angle. The face intersecting the flat surface may be a curved surface instead of a plane.

Regarding FIG. 2 and other drawings, roundness at corners of through hole 4 may be essential in some methods of forming through holes 4. These contours of ceramic bodies 3 can be selected as required. It is important to obtain the shape of a face necessary for each ceramic body 3.

Preferred embodiments of the present invention are described hereinafter with reference to the accompanying drawings.

FIGS. 1(*a*), (*b*), (*c*), and (*d*) are a series of typical schematic perspective views of a method of manufacturing ceramic bodies in accordance with the present invention.

Ceramic sheets 1 shown in FIG. 1(*a*) are laminated to produce laminate 2 shown in FIG.(*b*). FIG. 1(*c*) shows laminate 2 after cross-shaped through holes 4 are formed. FIG. 1(*d*) shows one of ceramic bodies 3 obtained by cutting.

The manufacturing process shown in FIG. 1 is an example in which laminate 2 made of ceramic sheets are used. However, laminate 2 is not necessarily a laminate of ceramic sheets, and may be a single ceramic sheet. When the single ceramic sheet is used, the lamination step shown in FIG. 1(*a*) is unnecessary.

Each of FIGS. 2 to 7 shows laminate 2 seen from the top. Reference numeral 5 in each of FIGS. 2 to 7 shows lines along which the laminate is cut.

Through hole 4 shown in each of FIGS. 2 to 7 is formed through in the direction of the thickness of laminate 2. Ceramic body 3 shown in each of FIGS. 2 to 7 indicates the position of ceramic body 3 in laminate 2. Each of these drawings shows ceramic body 3 of FIG. 1(*d*) that is seen from the top. Cutting laminate 2 having through holes 4 along cutting lines 5 provides laminates shaped like ceramic bodies 3.

Figure 5:
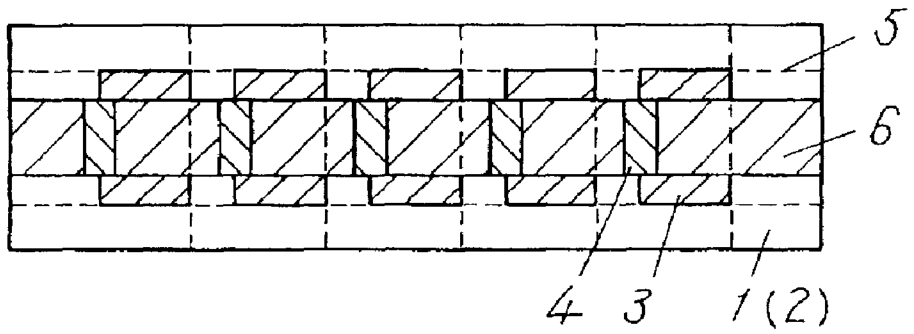
FIG. 5 is a schematic front view showing a formation of ceramic bodies in accordance with an exemplary embodiment of the present invention.
Figure 6:
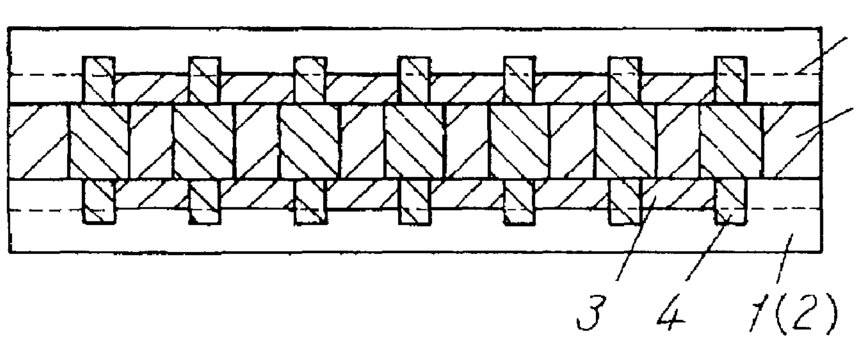
FIG. 6 is a schematic front view showing a formation of ceramic bodies in accordance with an exemplary embodiment of the present invention.
Figure 7:
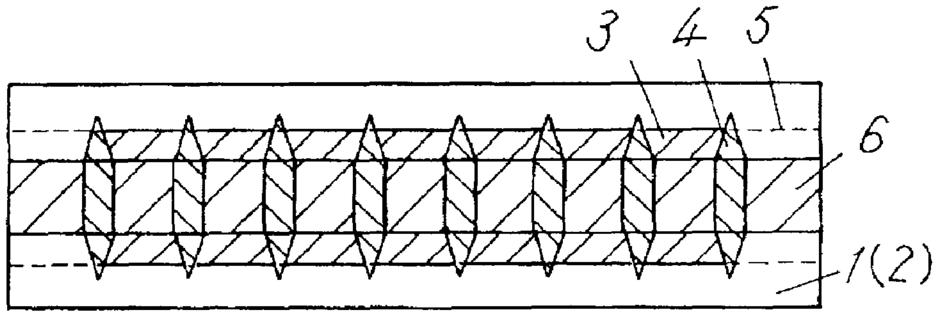
FIG. 7 is a schematic front view showing a formation of ceramic bodies in accordance with an exemplary embodiment of the present invention.
Figure 8:
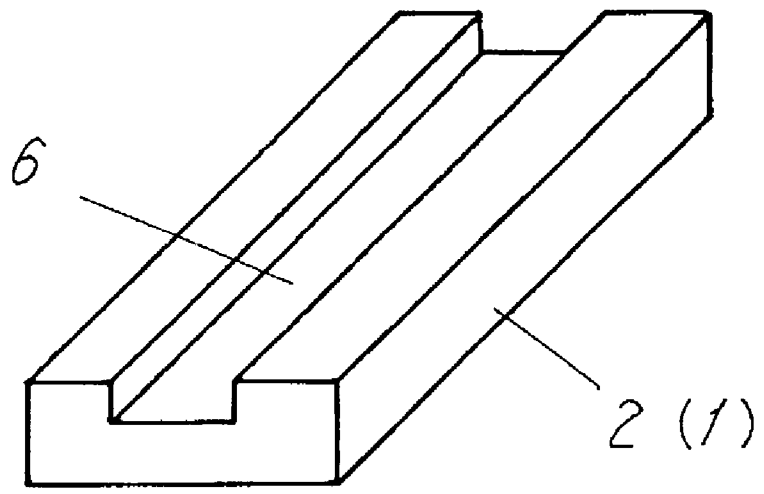
FIG. 8 is a schematic perspective view showing an appearance of ceramic bodies in accordance with the present invention.
Figure 9:
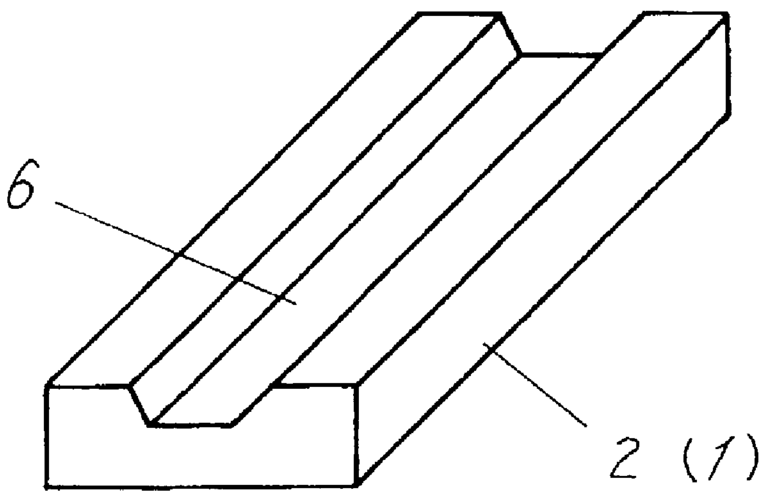
FIG. 9 is a schematic perspective view showing an appearance of ceramic bodies in accordance with the present invention.

Recess 6 in each of FIGS. 5 to 7 indicates a recess formed in a portion of a surface of laminate 2, as shown in FIGS. 8 and 9. This recess finally constitutes part of the contour of each ceramic body 3. The difference between FIGS. 2 and 5 is whether recess 6 exists or not. Other portions, i.e. through holes 4 and the shape of ceramic bodies 3 seen from the top, are the same. The relations between FIGS. 3 and 6, and FIGS. 4 and 7 are the same as that between FIGS. 2 and 5.

After through holes 4 each forming at least a part of the contour of each ceramic body 3 are formed through laminate 2 as shown in FIGS. 2 to 7, the laminate is cut along cutting lines 5 into separate ceramic bodies 3. Thus, ceramic bodies 3 are produced.

In accordance with another embodiment of the present invention, through holes 4 are formed while laminate 2 is pressed. Forming through holes 4 while pressing the laminate can considerably reduce burrs and non-flatness of other faces caused during the formation of through holes 4. In addition, it is also possible to form through holes 4 and recesses 6 while pressing laminate 2, and then cut the laminate along cutting lines 5 into separate ceramic body 3. Recesses 6 are formed in one or both of two faces of laminate 2. The sectional form of recess 6 may have a combination of a flat surface and slant surface.

Another example of the present invention is further described below.

Figure 10A:
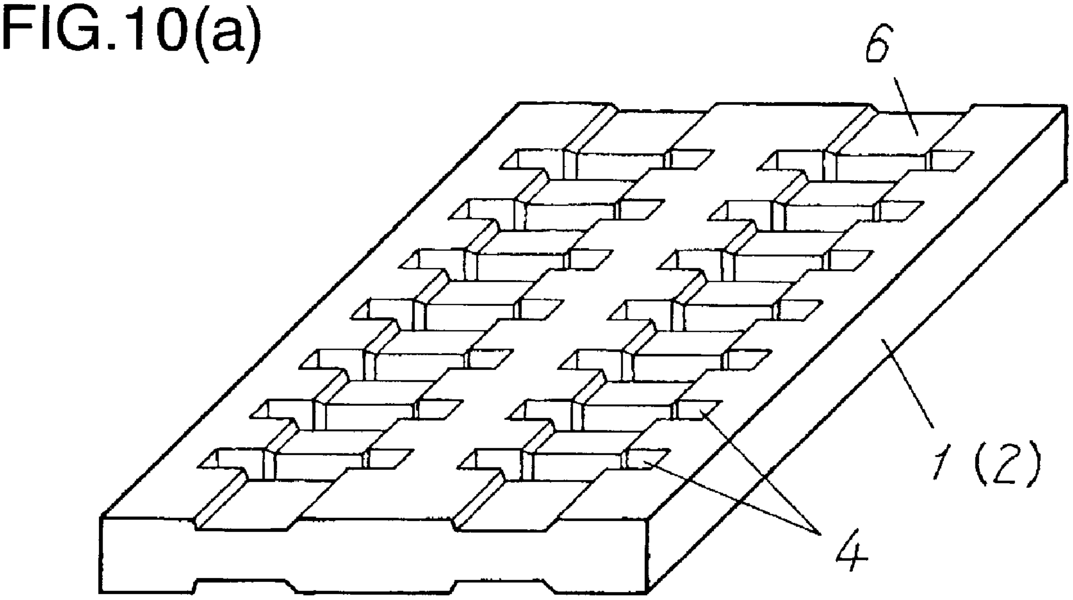
FIGS. 10(*a*) and (*b*) are schematic perspective views showing a formation of ceramic bodies in accordance with an exemplary embodiment of the present invention.
Figure 10B:
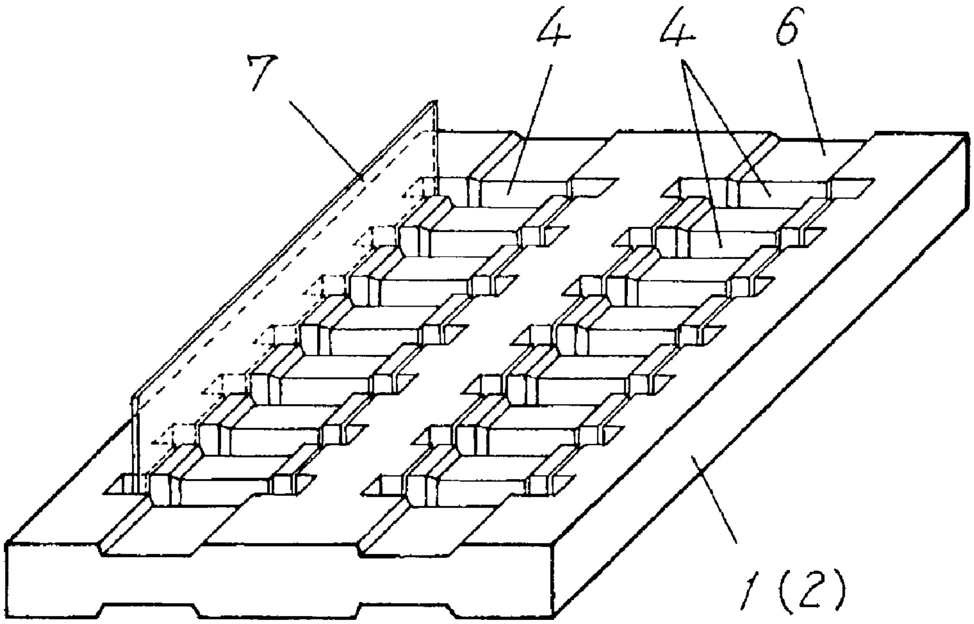

FIGS. 10(*a*) and (*b*) show the shape of a workpiece in process.

FIG. 10(*a*) shows laminate 2 with through-holes 4 formed through the laminate. Part of the laminate has been formed to a shape that forms at least a part of a contour of each ceramic body 3, by pressure molding or partial removal of the laminate. FIG. 10(*b*) shows how laminate 2 of FIG. 10(*a*) is cut into separate ceramic bodies 3, using cutter 7.

Typical cutting methods include a cutting using a slicer or a dicer with a grindstone as well as cutting using cutter 7 as shown in FIG. 10(*b*). When a cutter is used, the cutting operation exerts stress to the workpiece. However, when a grindstone is used, the cutting operation applies less load on the workpiece.

As described above, the present invention provides a method where at least a part of the contour of each of final ceramic bodies 3 are formed by a pressure-molding or partially removing of laminate 2, as required, in one operation, followed by a forming of through holes 4, and further separating and forming a plurality of ceramic bodies 3 by cutting the laminate. Therefore, this method allows a mass production of high-quality ceramic elements without causing problems, e.g. a defective shape caused by insufficient filling, or problem in flatness caused by a complicated shape and small size. These problems have been included in a conventional methods such as powder molding.

Figure 11:
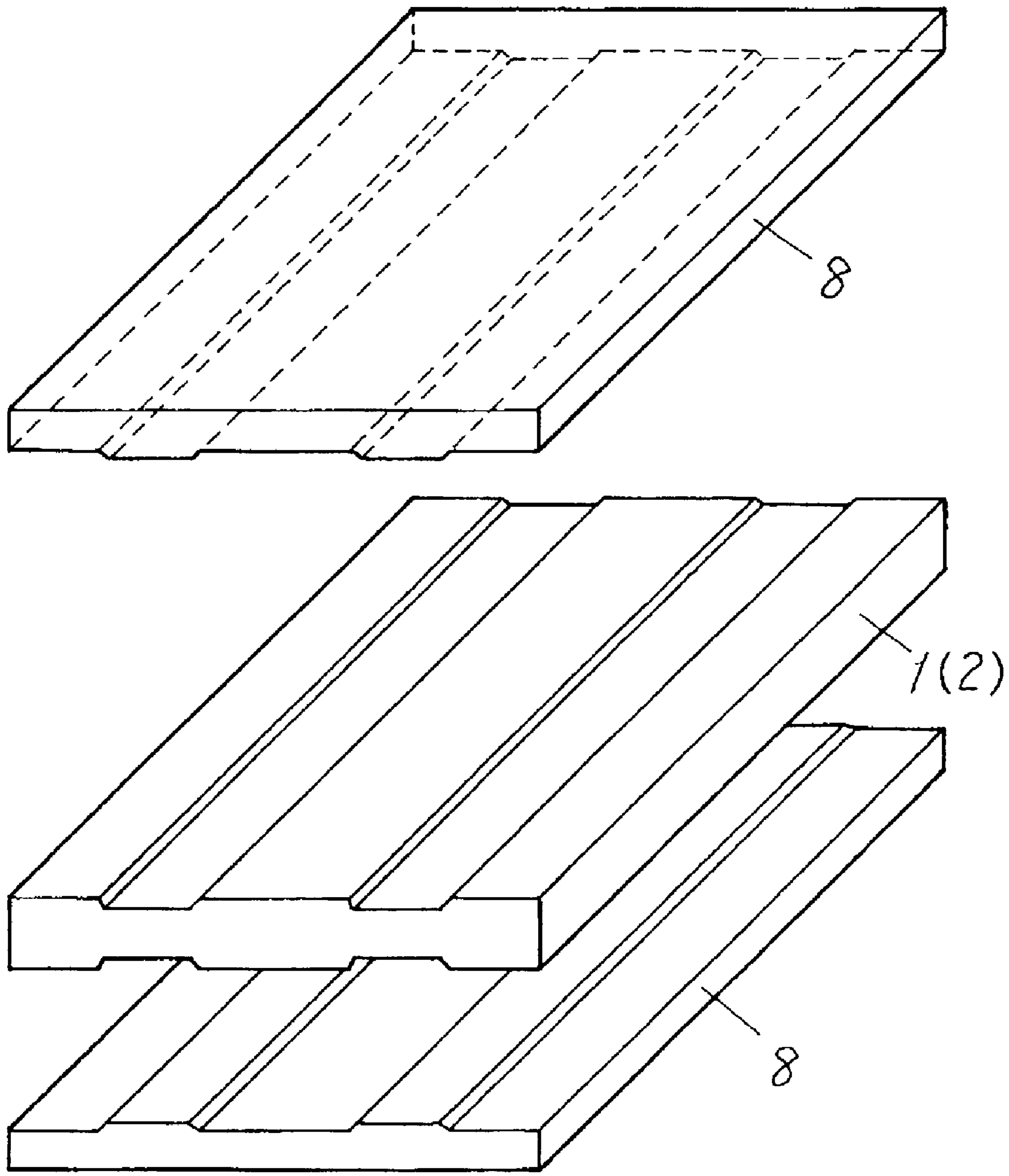
FIG. 11 is a schematic perspective view showing formation of ceramic bodies in accordance with another exemplary embodiment of the present invention.

In an example of the pressure-molding of the present invention, laminate 2 is pressure-molded using plates 8, each having recesses as shown in FIG. 11.

In order to obtain a shape like that of laminate 2 shown in FIG. 11 by a partial removal of the laminate 2, methods of grinding laminate 2, and removing parts of laminate 2 by sandblasting, laser beams, or other means can be used. Other various methods can also be used to remove predetermined portions. When produced by the partial removal method, laminate 2 has substantially uniform density, after the recess shape shown in FIG. 11 has been formed.

On the other hand, for the pressure molding method, laminate 2 generally has nonuniform density. However, when the pressure molding is performed under isostatic conditions and laminate 2 is sufficiently softened to flow, more uniform density and more excellent flatness can be obtained.

Through holes 4 can be formed by various kinds of methods, e.g. punching using a mold or the like, cutting using high-pressure fluid or laser beams, and mechanical drilling using a drill edge or the like.

In the above description, through holes 4 are formed after the pressure molding or partial removal. This is only an example, and these operations can be performed in reverse order.

Figure 12A:
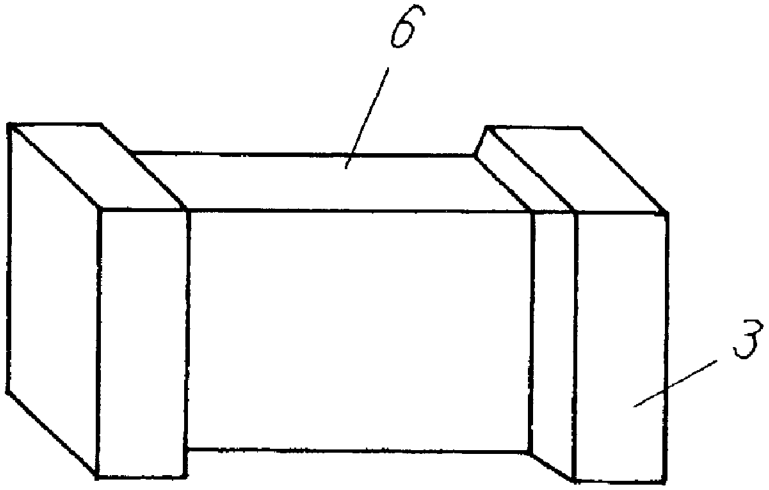
FIGS. 12(*a*) and (*b*) show an appearances of an example of a ceramic body produced by a manufacturing method in accordance with the present invention.
Figure 12B:
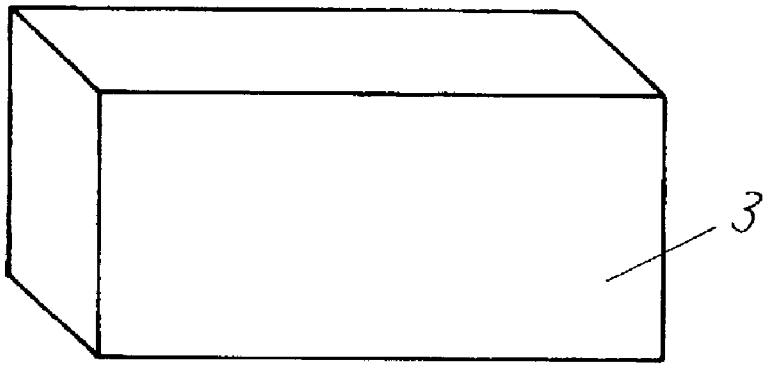

An example of a shape of ceramic body 3 obtained by the manufacturing method of the present invention is shown in FIG. 12 (*a*). Basic ceramic body 3 has a rectangular parallelepiped shape as shown in FIG. 12(*b*). Recesses 6 are formed in four faces of basic ceramic body 3 to form a shape shown in FIG. 12(*a*). In other words, the shape shown in FIG. 12(*b*) is defined as a basic shape and recesses 6 are formed in four side faces, i.e. four reference faces, to obtain the shape shown in FIG. 12(*a*). That is, a shape shown in FIG. 12(*a*) is produced by forming recesses 6 in four side faces, or four reference faces, of a reference shape shown in FIG. 12(*b*). In other words, one reference face of ceramic body 3 means one side face in FIG. 12(*b*).

Figure 13:
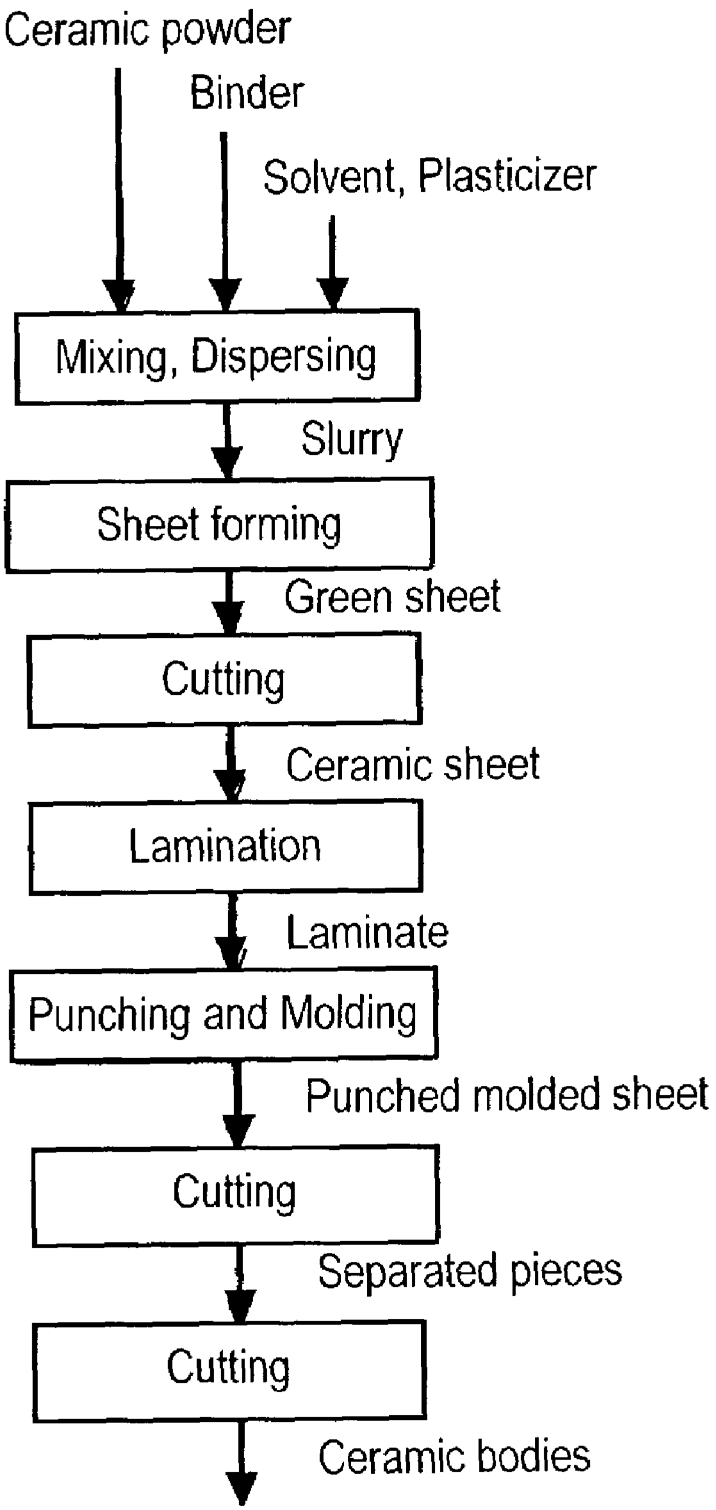
FIG. 13 is a flow diagram showing an example of a method of manufacturing ceramic bodies in accordance with the present invention.

Further details of the present invention are described in the following, using FIG. 13.

First, ceramic powder, a binder, a solvent and a plasticizer are mixed and dispersed to form slurry. A roll of green sheet is formed from the slurry, using a sheet-forming machine. The green sheet is cut into ceramic sheets having a predetermined size. As required, the cut ceramic sheets are laminated to form a laminate. The laminate is punched and molded to make a punched molded sheet (punching and molding).

After the above steps, a punched molded sheet having an appearance shown in FIG. 1(*c*) can be obtained. Then, as shown in FIG. 10(*b*), the punched molded sheet is cut, using a cutter or other means, to form ceramic bodies 3. Separate pieces that have been obtained by cutting are heated to burn out the binder and sintered to form sintered ceramic bodies. By the above method, ceramic bodies having a shape shown in FIG. 12(*a*) can be obtained.

Materials for the ceramic body include: glass, glass ceramics, Cu—Zn ferrite, non-magnetic ceramics represented by forsterite or alumina, and various kinds of ferrite materials that are metal oxide magnetic materials.

For example, when a ceramic body is used as a substrate for coil components, typical material thereof is alumina, ferrite or the like. Alumina or the like is also excellent material as a substrate for resistors or capacitors.

Slurry for forming the above described ceramic sheet comprises various kinds of ceramic powders, a solvent (e.g. butyl acetate, methyl ethyl keton, toluene, alcohol, butyl carbitol, and terpineol), and a binder (e.g. ethyl cellulose, polyvinyl butyral, polyvinyl alcohol, polyethylene oxide, and ethylene-vinyl acetate copolymer). A sintering promoter, such as various kinds of oxides and glasses, may be added to the slurry. A plasticizer, such as butyl benzyl phthalate, dibutyl phthalate and glycerin, may be added. Furthermore, a dispersant or the like may be added. A ceramic sheet is formed from such slurry, mixture of these ingredients.

The sintering temperature range of ceramic body 3 varies with the composition of the ceramic used. Typically, the sintering temperature ranges from approx. 800° C. to 1,600° C.

Next, more specific examples of the present invention are described.

EXAMPLE 1

Alumina slurry was prepared by mixing and dispersing 96 g of alumina powder, 2 g of copper oxide, and 2 g of titanium oxide with eight grams of butyral resin, 4 g of butyl benzyl phthalate, 24 g of methyl ethyl keton, and 24 g of butyl acetate using a pot mill.

An alumina green sheet (ceramic green sheet) 0.2 mm in thickness (after being dried) was formed from the slurry using a coater. The alumina green sheet was formed on PET film.

The alumina green sheet was cut into pieces, each measuring 11 cm long and 4.5 cm wide. Three pieces of the green sheet were laminated, and then punched and molded, using a mold, at the same time to form a punched molded sheet as shown in FIG. 10(*a*). The sectional shape of a punching pin has a cross shape. The number of pins used in the mold was 648. The mold was structured to have 8 rows of 81 pins.

Because each of the upper and lower faces of the mold had 8 rows of projections, recesses 6 as shown in FIG. 10(*a*) were formed in laminate 2. Pressing was performed at room temperature. The molding pressure was 1000 kgf/cm$^2$. The punched molded green sheet was cut along the lines shown by cutter 7 in FIG. 10(*b*), using a cutting machine. The number of cuts was two shots for each row, and thus 16 shots in total. Therefore, 640 pieces of ceramic bodies 3 could be produced from one laminate 2.

Next, these ceramic bodies 3 were heated to burn out the binder and sintered to produce alumina bodies having a shape shown in FIG. 12(*a*). The ceramic bodies were sintered under the condition that a sintering temperature of 1300° C. was maintained for two hours.

In the ceramic bodies (alumina bodies) produced in this example, any defect, e.g. chip, crack, warp and insufficient filling, was not observed. In addition, the smoothness of the surface thereof was excellent.

EXAMPLE 2

The mold used in this example was similar to that of Example 1, except that the upper and lower faces of the mold were formed of flat surfaces. Ceramic bodies 3 were formed in a manner similar to that of Example 1, using this mold.

In the ceramic bodies (alumina bodies) produced by the method of the present invention, any defect, e.g. chip, crack, warp and insufficient filling, was not observed.

EXAMPLE 3

100 g of Ni—Zn—Cu ferrite powder was mixed with eight grams of butyral resin, 4 g of butyl benzyl phthalate, 24 g of methyl ethyl keton, and 24 g of butyl acetate and kneaded using a pot mill to prepare ferrite slurry.

A ferrite green sheet 0.2 mm in thickness (after being dried) was formed from this slurry, using a coater. The ferrite green sheet was formed on PET film.

Ceramic bodies made of ferrite were formed using this ferrite green sheet, in the manner as in Example 1. The ceramic bodies were sintered under the condition that a sintering temperature of 900° C. was maintained for two hours.

In the ceramic bodies 3 (ferrite elements) produced by the method of the present invention, any defect, e.g. chip, crack, warp and insufficient filling, was not observed.

EXAMPLE 4

Five alumina green sheets prepared in Example 1 were laminated. The lamination pressure was 500 $kgf/cm^2$.

The laminate 2 was ground into a shape as shown in FIG. 11. Next, using a mold, through holes 4 as shown in FIG. 10(*a*) were formed through laminate 2 having recesses 6 made by grinding.

The laminate 2 having through holes 4 formed therethrough was cut in a manner as in Example 1, and sintered to produce ceramic bodies.

In the ceramic bodies (alumina elements) produced in this manner, any defect, e.g. chip, crack, warp and insufficient filling, was not observed.

EXAMPLE 5

Five ferrite green sheets prepared in Example 3 were laminated. The lamination pressure was 500 $kgf/cm^2$.

Figure 14:
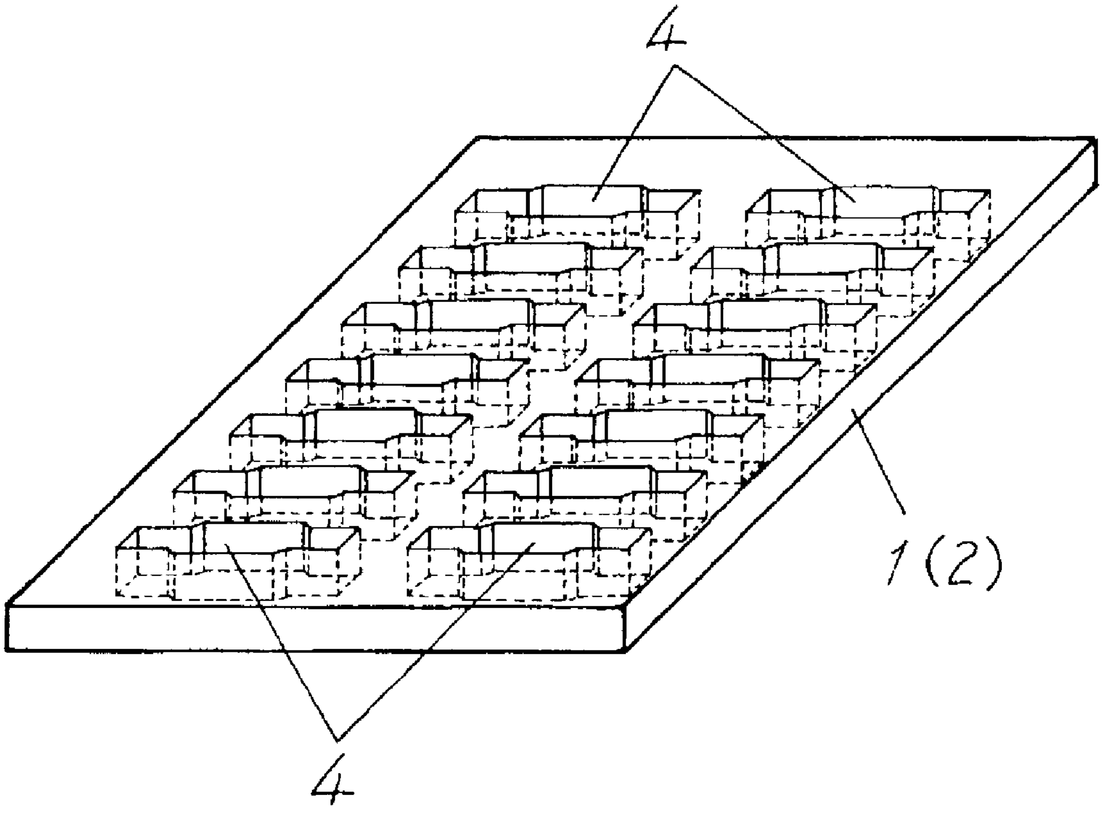
FIG. 14 is a schematic perspective view showing a formation of ceramic bodies in accordance with another exemplary embodiment of the present invention.

Through holes 4 were formed through this laminate 2, using a mold, to prepare laminate 2 having a shape as shown in FIG. 14. Then, the laminate 2 was cut in a manner similar to those of the above-mentioned examples, and sintered under the condition that a sintering temperature of 900° C. was maintained for two hours. Thus, ceramic bodies (ferrite elements) were prepared.

In the ceramic bodies (ferrite bodies) produced in this manner, any defect, e.g. chip, crack, warp and insufficient filling, was not observed.

INDUSTRIAL APPLICABILITY

As obvious from the above description, a method of manufacturing ceramic bodies of the present invention has the steps of: forming through holes each forming at least a part of the contour of each ceramic element; and cutting the laminate to produce pieces of ceramic elements. Moreover, the method of manufacturing ceramic bodies further includes a step of forming a recess, pressure-molded portion, or partially removed portion that forms at least part of the contour of each ceramic element, as required. The manufacturing method of the present invention allows mass production of small ceramic elements of a complicated shape that have excellent flatness and no chip, crack, or uneven filling. Therefore, the method has a large industrial value.

The invention claimed is:

1. A method of manufacturing a ceramic body by a sheet forming process comprising:

providing a ceramic sheet;

forming at least two parallel channels in said ceramic sheet, said parallel channels having three sides, said parallel channels being at least one part of a contour of a ceramic body and wherein a thickness of said ceramic sheet at portions where said at least two parallel channels are formed is thinner than other portions of said ceramic sheet;

forming a through hole in said ceramic sheet, said through hole being connected to one of said parallel channels, and at least one surface of said through hole comprising a flat surface of the contour of the ceramic body; and cutting said ceramic sheet to form a ceramic body, wherein at least part of the contour of said ceramic body comprises a combination of a flat surface and a slanted surface intersecting the flat surface at an angle, said slanted surface being at least one surface of said parallel channels.

2. The method of manufacturing a ceramic body as set forth in claim 1, wherein said ceramic sheet comprises a laminate of a plurality of ceramic sheets.

3. The method of manufacturing a ceramic body as set forth in claim 1, further comprising forming at least one part of the contour of said ceramic body by pressure molding.

4. The method of manufacturing a ceramic body as set forth in claim 3, wherein said ceramic sheet is a laminate of a plurality of ceramic sheets.

5. The method of manufacturing a ceramic body as set forth in claim 1, further comprising partially removing a portion of said ceramic sheet for forming at least one part of the contour of said ceramic body.

6. The method of manufacturing a ceramic body as set forth in claim 5, wherein said ceramic sheet is a laminate of a plurality of ceramic sheets.

7. The method of manufacturing a ceramic body as set forth in claim 1, wherein said through hole is press-formed.

8. A method of manufacturing a ceramic body by a sheet forming process, comprising:

providing a ceramic sheet;

forming at least two parallel channels in said ceramic sheet, said parallel channels having three sides, said parallel channels being at least one part of a contour of a ceramic body and wherein a thickness of said ceramic sheet at portions where said at least two parallel channels are formed is thinner than other portions of said ceramic sheet;

forming a through hole in said ceramic sheet, said through hole being connected to one of said parallel channels, and at least one surface of said through hole comprising a flat surface of the contour of the ceramic body; and cutting said ceramic sheet to form a ceramic body, wherein a shape of said through hole comprises a combination of a flat surface and a slanted surface, said slanted surface being at least one surface of said parallel channels.

9. The method of manufacturing a ceramic body as set forth in claim 1, wherein said parallel channels are press-formed.

10. The method of manufacturing a ceramic body as set forth in claim 9, wherein said parallel channels comprise one face of a contour of said ceramic body.

11. The method of manufacturing a ceramic body as set forth in claim 9, wherein said parallel channels comprise two faces of a contour of said ceramic body.

12. The method of manufacturing a ceramic body as set forth in claim 9, wherein a shape of said parallel channels comprises a flat surface.

13. The method of manufacturing a ceramic body as set forth in claim 9, wherein a shape of said parallel channels comprises a combination of a flat surface and a slanted surface intersecting the flat surface at an angle, said slanted surface being at least one surface of said parallel channels.

* * * * *